(12) United States Patent
Southward et al.

(10) Patent No.: US 9,403,151 B2
(45) Date of Patent: Aug. 2, 2016

(54) BASIC EXCHANGE FOR ENHANCED REDOX OS MATERIALS FOR EMISSION CONTROL APPLICATIONS

(75) Inventors: Barry W. L. Southward, Paris (FR); Curt Ellis, Broken Arrow, OK (US)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 1370 days.

(21) Appl. No.: 12/363,310

(22) Filed: Jan. 30, 2009

(65) Prior Publication Data

US 2010/0197479 A1   Aug. 5, 2010

(51) Int. Cl.

| | |
|---|---|
| B01J 21/00 | (2006.01) |
| B01J 23/00 | (2006.01) |
| B01J 23/10 | (2006.01) |
| B01J 25/00 | (2006.01) |
| B01J 29/00 | (2006.01) |
| B01J 23/83 | (2006.01) |
| B01J 23/66 | (2006.01) |
| B01J 35/00 | (2006.01) |
| B01J 37/02 | (2006.01) |
| B01J 37/30 | (2006.01) |

(52) U.S. Cl.
CPC  *B01J 23/83* (2013.01); *B01J 23/66* (2013.01); *B01J 35/002* (2013.01); *B01J 37/0201* (2013.01); *B01J 37/30* (2013.01); *B01J 23/10* (2013.01)

(58) Field of Classification Search
USPC ............... 502/11, 100, 300, 301, 302, 304
See application file for complete search history.

(56) References Cited

U.S. PATENT DOCUMENTS

| | | | | |
|---|---|---|---|---|
| 3,894,965 | A | * | 7/1975 | Foster ............... B01D 53/86 502/261 |
| 3,993,572 | A | * | 11/1976 | Hindin ............. B01D 53/9413 423/213.5 |
| 4,738,947 | A | * | 4/1988 | Wan ................ B01D 53/945 423/213.5 |
| 4,902,487 | A | | 2/1990 | Cooper et al. |
| 5,064,803 | A | | 11/1991 | Nunan |
| 5,371,056 | A | | 12/1994 | Leyrer et al. |
| 5,462,907 | A | | 10/1995 | Farrauto et al. |
| 5,556,825 | A | * | 9/1996 | Shelef ............... B01D 53/945 423/213.5 |
| 5,693,299 | A | | 12/1997 | Chopin et al. |
| 5,712,218 | A | | 1/1998 | Chopin et al. |

(Continued)

FOREIGN PATENT DOCUMENTS

| | | |
|---|---|---|
| CN | 1193948 | 9/1998 |
| EP | 1 504 815 | 2/2005 |

(Continued)

OTHER PUBLICATIONS

PCT International Preliminary Report on Patentability (Form PCT/IB/373) issued Sep. 28, 2010 for International Application No. PCT/EP2009/002263.

(Continued)

*Primary Examiner* — James McDonough
(74) *Attorney, Agent, or Firm* — Smith, Gambrell & Russell, LLP

(57) ABSTRACT

An Oxygen Ion Conductor (OIC)/Oxygen Storage (OS) material is disclosed, more particularly an OIC/OS having a stable cubic crystal structure, related to a method for the promotion of the catalytic properties of OIC/OS by the post-synthetic introduction of non-precious metals via a basic (alkaline) exchange process and the application of said materials to control of vehicle exhaust emissions.

15 Claims, 14 Drawing Sheets

(56) References Cited

U.S. PATENT DOCUMENTS

| | | | |
|---|---|---|---|
| 6,040,265 A | 3/2000 | Nunan et al. | |
| 6,133,194 A | 10/2000 | Cuif et al. | |
| 6,153,160 A | 11/2000 | Voss et al. | |
| 6,214,306 B1 | 4/2001 | Aubert et al. | |
| 6,248,684 B1 | 6/2001 | Yavuz et al. | |
| 6,255,242 B1 | 7/2001 | Umemoto et al. | |
| 6,255,249 B1 | 7/2001 | Voss et al. | |
| 6,274,107 B1 | 8/2001 | Yavuz et al. | |
| 6,387,338 B1 | 5/2002 | Anatoly et al. | |
| 6,458,741 B1 | 10/2002 | Roark et al. | |
| 6,468,941 B1 | 10/2002 | Bortun et al. | |
| 6,506,705 B2 | 1/2003 | Blanchard et al. | |
| 6,548,446 B1 | 4/2003 | Koermer et al. | |
| 6,585,944 B1 * | 7/2003 | Nunan | B01D 53/945 423/239.1 |
| 6,605,264 B2 | 8/2003 | Bortun et al. | |
| 6,689,327 B1 | 2/2004 | Reck et al. | |
| 6,750,168 B2 | 6/2004 | Yan et al. | |
| 7,078,004 B2 | 7/2006 | Voss et al. | |
| 7,313,913 B2 | 1/2008 | Okugawa et al. | |
| 7,412,822 B2 | 8/2008 | Zhan et al. | |
| 7,433,776 B1 | 10/2008 | Hunter et al. | |
| 7,441,403 B2 | 10/2008 | Sun et al. | |
| 7,469,532 B2 | 12/2008 | Williamson et al. | |
| 7,943,104 B2 | 5/2011 | Kozlov et al. | |
| 8,017,097 B1 | 9/2011 | Southward et al. | |
| 8,778,831 B2 | 7/2014 | Southward et al. | |
| 2002/0195173 A1 | 12/2002 | Bortun et al. | |
| 2005/0282698 A1 | 12/2005 | Southward et al. | |
| 2006/0052243 A1 | 3/2006 | Muhammed et al. | |
| 2006/0162317 A1 | 7/2006 | Twigg et al. | |
| 2006/0210462 A1 | 9/2006 | Larcher et al. | |
| 2006/0252638 A1 | 11/2006 | Matsueda et al. | |
| 2007/0104623 A1 | 5/2007 | Dettling et al. | |
| 2007/0244002 A1 | 10/2007 | Kozlov et al. | |
| 2008/0202107 A1 | 8/2008 | Boorse et al. | |
| 2009/0246109 A1 | 10/2009 | Southward | |
| 2009/0259735 A1 | 10/2009 | Southward et al. | |
| 2009/0274599 A1 | 11/2009 | Larcher et al. | |
| 2010/0040523 A1 | 2/2010 | Larcher et al. | |
| 2010/0077727 A1 | 4/2010 | Southward et al. | |
| 2010/0196217 A1 | 8/2010 | Southward | |

FOREIGN PATENT DOCUMENTS

| | | | |
|---|---|---|---|
| EP | 1994982 A1 * | 11/2008 | B01J 21/04 |
| JP | H04-114742 | 4/1992 | |
| JP | H04-334548 | 11/1992 | |
| JP | H05-220395 | 8/1993 | |
| JP | H10-216509 | 8/1998 | |
| JP | 2004-337840 | 12/2004 | |
| JP | 2005-296735 | 10/2005 | |
| JP | 2005-296816 | 10/2005 | |
| JP | 2006-187675 | 7/2006 | |
| JP | 2006-326478 | 12/2006 | |
| JP | 2007-301471 | 11/2007 | |
| JP | 2011-515220 | 5/2011 | |
| JP | 2011-515221 | 5/2011 | |
| JP | 2011-526198 | 10/2011 | |
| WO | 2005/031132 | 4/2005 | |
| WO | WO 2006/079850 A | 8/2006 | |
| WO | WO 2006/090190 A | 8/2006 | |
| WO | WO 2007/111004 A | 10/2007 | |

OTHER PUBLICATIONS

PCT Written Opinion of the International Searching Authority (Form/ISA/237) issued Sep. 27, 2010 for International Application No. PCT/EP2009/002263.

International Search Report issued in corresponding international application No. PCT/EP2009/002262 filed on Mar. 27, 2009.

Shu-Ping Wang, et al. "Synthesis, characterization and catalytic activity . . . " Mar. 15, 2007, Journal of Molecular Catalysis A: Chemical 272 45-52.

Neeft et al., "Catalysts for the oxidation of soot from diesel exhaust gases. I. An exploratory study", Applied Catalysis B: Environmental 8, 1996, pp. 57-78.

Southward et al., "An Investigation into the NO2-Decoupling of Catalyst to Soot Contact and Its Implications for Catalysed DPF Peformance", SAE International, Paper No. 2008-01-0481, Date Published: Apr. 14, 2008 (08PFL-675).

Maya G., Catalysis by Transition Metal Modified Ceria and Ceria-Zirconia Mixed Oxides Prepared via Sol-Gel Route, 2006, Cochin University of Science and Technology 1-170.

Morlang, A. et al. (2005) "Bimetallic Pt/Pd Diesel Oxidation Catalysts Structural Characterisation and Catalytic Behaviour" Applied Catalysts B: Environmental 60:191-199.

John P.A. Neeft et al., "Catalysts for the oxidation of soot from diesel exhaust gases. II. Contact between soot and catalyst under practical conditions", Applied Catalysis B: Environmental 12, 1997, pp. 21-31.

M. Pfeifer et al., "New Platinum/Palladium Based Catalyzed Filter Technologies for Future Passenger Car Applications", SAE Technical Paper Series, 2007-01-0234, 2007.

Twigg, M. (2006) "Progress and Future Challenges in Controlling Automotive Exhaust Gas Emissions" Applied Catalysts B: Environmental 70:2-15.

* cited by examiner

Figure 9:

| Description | Phase Identification | Lattice Constants (Å) | Crystal Size Calculation of (Å) | |
|---|---|---|---|---|
| | | | CS | R(%) |
| 1% Cu OS2 Fresh | Cubic phase | 5.259(2) | 72(2) | 5.59 |
| 2.5% Cu OS2 Fresh | Cubic phase | 5.256(1) | 73(2) | 5.29 |
| 5% Cu OS2 Fresh | Cubic phase<br>Tenorite CuO | 5.263(3) | 72(2) | 6.13 |
| 1% Cu OS2, 800 Aged | Cubic phase | 5.257(2) | 104(2) | 6.13 |
| 2.5% Cu OS2, 800 Aged | Cubic phase | 5.255(1) | 154(2) | 5.35 |
| 5% Cu OS2, 800 Aged | Cubic phase<br>Tenorite CuO | 5.252(1) | 130(2) | 5.82 |
| 1% Cu OS2, 1100 Aged | Cubic phase<br>Baddeleyite $ZrO_2$<br>Cubic $ZrO_2$ | 5.326(1) | >1000 | 6.78 |
| 2.5% Cu OS2, 1100 Aged | Cubic phase<br>Baddeleyite $ZrO_2$<br>Cubic $ZrO_2$ | 5.3223(9) | >1000 | 5.7 |
| 5% Cu OS2, 1100 Aged | Cubic phase<br>Baddeleyite $ZrO_2$<br>Cubic $ZrO_2$<br>Tenorite CuO | 5.318(1) | >1000 | 5.74 |

Figure 11:

| Description | Phase I.D. | Lattice Constant / A | Cubic Crystal Size / A |
|---|---|---|---|
| 1% FeTEA OS3 Fresh | Cubic phase | 5.263(2) | 70(2) |
| 2.5% FeTEA OS3 Fresh | Cubic phase | 5.255(2) | 71(2) |
| 5% FeTEA OS3 Fresh | Cubic phase | 5.263(2) | 70(2) |
| 1% FeTEA OS3,800 Aged | Cubic phase | 5.255(2) | 97(2) |
| 2.5% FeTEA OS3, 800 Aged | Cubic phase | 5.257(2) | 132(2) |
| 5% FeTEA OS3, 800 Aged | Cubic phase | 5.251(2) | 122(2) |
| 1% FeTEA OS3, 1100 Aged | Cubic & tetragonal phase | 5.3040(7) | >1000 |
| 2.5% FeTEA OS3, 1100 Aged | Cubic & tetragonal phase $Fe_2O_3$ | 5.3062(7) | >1000 |
| 5% FeTEA OS3, 1100 Aged | Cubic & tetragonal phase $Fe_2O_3$ $CeFeO_3$ | 5.302(1) | >1000 |

Figure 13:

| Description | Phase I.D. | Lattice Constant / Å | Cubic Crystal Size / Å |
|---|---|---|---|
| 2Ag exchanged OS1 Fresh | Cubic phase | 5..299(5) | 55(2) |
| 2Ag exchanged OS1 800 Aged | Cubic phase | 5.294(3) | 85(2) |
| 2Ag OS1 Synthesis Fresh | Segregated Cubic phases | 5.375(7) | 57(5) |
| | | 5.2602 | Too weak |
| 2Ag OS1 Synthesis 800 Aged | Segregated Cubic phases | 5.302(3) | 80(5) |
| | | 5.388(5) | Too close to main peak |

BASIC EXCHANGE FOR ENHANCED REDOX OS MATERIALS FOR EMISSION CONTROL APPLICATIONS

INTRODUCTION AND BACKGROUND

Oxygen Storage (OS) materials are well known solid electrolytes based on, for example, Ceria-Zirconia ($CeO_2$—$ZrO_2$) solid solutions. They are a ubiquitous component of aftertreatment catalysts for gasoline vehicles due to their ability to 'buffer' the active components in the catalyst against local fuel rich (reducing) or fuel lean (oxidising) conditions. OS materials do this by releasing active oxygen from their 3-D structure in a rapid and reproducible manner under oxygen-depleted transients, regenerating this 'lost' oxygen by adsorption from the gaseous phase when oxygen rich conditions arise. This reduction-oxidation (hereafter redox) chemistry is attributed to the $Ce^{4+} \leftrightarrows Ce^{3+}$ redox couple, with the oxidation state of Ce depending upon local $O_2$ content. This high availability of oxygen is critical for the promotion of generic oxidation/reduction chemistries e.g. CO/NO chemistry for the gasoline three-way catalyst, or more recently for the direct catalytic oxidation of particulate matter (soot) in the catalysed diesel particulate filter (CDPF) e.g. US2005 0282698 A1.

Hence there have been extensive studies on the chemistry, synthesis, modification and optimisation of Ce—Zr based OS materials. For example, the use of Ceria-Zirconia materials doped with lower valent ions for emission control applications have been extensively studied e.g. U.S. Pat. No. 6,468,941, U.S. Pat. No. 6,585,944 and US2005 0282698 A1. These studies demonstrate that lower valent dopant ions such as Rare Earth metals e.g. Y, La, Nd, Pr, etc., Transition metals e.g. Fe, Co, Cu etc. or Alkaline Earth metals e.g. Sr, Ca and Mg can all have a beneficial impact upon oxygen ion conductivity. This is proposed to arise from the formation of oxygen vacancies within the cubic lattice of the solid solution which lowers the energy barrier to oxygen ion transport from the crystal bulk to the surface thereby enhancing the ability of the solid solution to buffer the air fuel transients occurring in the exhaust stream of a typical gasoline (three-way) catalyst application.

Additionally it has been shown (U.S. Pat. No. 6,468,941 and U.S. Pat. No. 6,585,944) that the use of specific examples of the above dopants can provide full stabilisation of the preferred Cubic Fluorite lattice structure for Ceria-Zirconia solid solutions, with Y being identified as having particular benefit. The presence of the preferred Cubic Fluorite structure has been found to correlate with the most facile redox chemistry for $Ce^{4+} \leftrightarrows Ce^{3+}$, from both the surface and bulk of the crystal, thus dramatically increasing the oxygen storage and release capacity, as compared to bulk $CeO_2$. This benefit is especially pronounced as the material undergoes crystal growth/sintering due to the hydrothermal extremes present in typical exhaust environments. The incorporation of especially Y and to a lesser extent La and Pr have also been demonstrated to limit or, in certain cases, circumvent the disproportionation of the single cubic phase Ceria-Zirconia into a composite consisting of more Ce-rich cubic phases and more Zr-rich tetragonal phases, a process which results in marked decrease in redox function, surface area etc. of the solid solution.

Finally U.S. Pat. No. 6,468,941 and U.S. Pat. No. 6,585,944 teach the potential for employing base i.e. non-precious group (Pt, Pd, Rh, Au etc.) dopant metals into the Cubic Fluorite lattice of the solid solution as an alternative means to promote the redox chemistry of Ce, with Fe, Ni, Co, Cu, Ag, Mn, Bi and mixtures of these elements being identified as of particular interest. Hence while non-promoted OS materials typically exhibit a redox maximum, as determined by $H_2$ Temperature Programmed Reduction (TPR), at ca. 600° C., the inclusion of base metals within the lattice can decrease this temperature by >200° C. or more at a fraction of the cost incurred by the use of precious metals.

However, while these base metals can be beneficially incorporated in the CeZrOx lattice and this incorporation can significantly promote low temperature redox function for fresh materials, the addition of these elements can also decrease fresh and aged phase purity and significantly decrease hydrothermal durability (promote crystal sintering and material densification), leading to losses in aged performance cf. base compositions without additional base metal. In addition during conventional aging cycles reactions may occur between the gas phase and the CeZr material which can result in extraction of these additional base elements from the Cubic Fluorite lattice. This in turn can result in formation of separate bulk phase(s) with low intrinsic catalytic activity or in a worst case scenario, phases which directly interact with the OS or other catalyst component resulting in a direct or indirect poisoning of the catalyst.

Thus, the aforementioned materials are potentially limited in their scope. For example, while lower valent ions may be successfully incorporated in the synthesis of a solid solution this can only be achieved by careful control of the synthesis and within specific limits for the final composition. This is necessary to ensure both the electrical neutrality and the preservation of the favoured Cubic Fluorite single-phase structure of the resultant compound. Hence, for example, the synthesis of an OS material containing a specific low valent base metal promoter 'doped' into a Cubic Fluorite structure with high Ce (>50 mol %) and/or low Zr (<30 mol %) contents is not facile and there is significant potential that the synthesis could result in a material with disproportionation into Ce-rich and Ce-poor domains, with a marked decrease in performance.

Similarly great care must be taken to balance the ultimate electrical 'charge' of the solid solution, hence the incorporation of $Nb^{5+}$ in the cubic lattice may also be achieved but only by introduction of equimolar quantities of $Y^{3+}$, in order to preserve the overall cationic charge balance of $4^+$. Again any imbalance or heterogeneity of Nb/Y content within the local crystal structure is undesirable and could lead to phase stability and purity issues with ultimate loss of required redox function as outlined in U.S. Pat. No. 6,605,264.

A further, and perhaps more significant, drawback of introducing low valent base metal ions within the Cubic Fluorite lattice is that the ions are dispersed throughout the bulk of the crystal structure and thus the surface concentration of the ions may be very low. This in turn limits the extent of the dopant ions to interact directly with the exhaust environment. Thus while it is possible to dope to Sr, Ca and Mg etc. into the cubic lattice the ability of these ions to provide additional chemical functionality e.g. as a NOx trap to provide transient adsorption of NO and $NO_2$ is limited by the available concentrations of ions in the surface and immediate sub-surface of the crystal.

What is needed in the art are stable OIC/OS materials with facile and high oxygen storage and oxygen ion conductivity properties for any practical Ce-content. Moreover, greater flexibility of composition is required without the current penalty of decreased durability and activity. Finally the manner by which these enhancements are realised should be facile and robust with minimal process steps for maximum throughput.

SUMMARY OF THE INVENTION

Significant improvements in the performance of Oxygen Storage (OS) materials based upon $ZrO_2/CeO_2$ solid solutions containing a substantially phase pure Cubic Fluorite structure may be achieved by specific ion exchange of base i.e. non-precious group metals. The ion exchange process described herein is performed under chemically basic i.e. conditions of high pH, that is say high $OH^-$/low Hydronium ($H_3O^+$) or proton ($H^+$) content. The basic ion exchange process is a discrete, post-synthetic modification and hence provides for markedly higher flexibility of composition, dopant ion type and concentration as compared to conventional direct synthetic methods as described in previous work (U.S. Pat. No. 6,468,941 and U.S. Pat. No. 6,585,944). The resultant materials demonstrate high activity and hydrothermal durability under all aging conditions examined. This is in contrast to promotion that may be realised by conventional impregnation of an acidic metal e.g. metal nitrate where formation of bulk oxide phases in fresh materials and rapid sintering of such oxide phases, with resultant deactivation, is the norm. Thus, the method developed provides a wide, and novel, range of materials of stable and highly active OS materials that may be advantageously applied to a wide range of emission control applications for both gasoline and diesel vehicles. Moreover, the method of this invention enables choice and tailoring of the base metal promotant to introduce specific chemical synergies to incorporate or enhance additional catalytic functions, e.g. lean NOx control.

Specifically, high redox activity can be obtained by the modification of solid solutions based on Ce—ZrOx by a mechanism which is proposed, while not wishing to be bound by theory, to involve the basic/alkaline exchange of the pre-existing Ce—OH hydroxyl defect sites that exist within all OS materials. The Ce—OH sites are believed to arise at $Ce^{3+}$ defect sites within the lattice and the presence of the proton of the hydroxyl group being a requirement for electrical neutrality of the lattice. The proposed exchange of the $H^+$ atom by metal ions enables the incorporation and stabilisation of specific mono-valent (e.g. $K^+$), di-valent (e.g. $Cu^{2+}$), tri-valent (e.g. $Fe^{3+}$) and higher valence ions of very high dispersion (which may approach atomic levels of dispersion) within the oxide matrix. The choice of base metals to be incorporated within the mixed oxide in this manner can additionally be based upon oxides known to be active for reactions of especial interest or catalytic importance. Examples include, but are not limited to, direct catalytic soot oxidation, low temperature SCR (Selective Catalytic Reduction by urea, $NH_3$ or hydrocarbons), NOx trapping, low temperature CO—NO or CO—$O_2$ reaction promoters, hydrocarbon cracking function (e.g. by increasing the acidity of the OS), etc. Metals appropriate to these examples include Ag, Cu, Co, Mn, Fe, alkali metals, alkaline earth metals or transitions metals, or other metal or metalloid known to form a stable nitrate which can undergo subsequent decomposition and reduction $N_2$ under conditions within the conventional operational window of the vehicle exhaust. The term "transition metal" means the 38 elements in Groups 3 to 12 of the Periodic Table of Elements.

Prior developments in this field are described in U.S. Pat. Nos. 6,585,944 and 6,468,941, although in these patents the Ce—$ZrO_2$ system is used as a host matrix into which other catalytically active ions are introduced in a deliberate modification of the normal synthetic method. The incorporation of active ions in this way, while successful, does impose specific limits upon the types of dopants which may be introduced as well as their concentrations within the lattice i.e. the maximum 'solubility' in the solid which still provides the favoured substantially phase pure cubic fluorite structure, known to provide the optimal redox characteristics for the OS material. In contrast in the present invention the association of the promotant occurs post-synthesis, and while not wishing to be bound by theory, via a specific ion exchange mechanism and the ions thus introduced and incorporated in a range of sites associated with the $Ce^{3+}$—OH defects and not in any well defined and unique cationic position. Hence, the method of the present invention enables the introduction of higher concentrations of the base metal ions/oxide component since the loading is not limited by its solubility within a well-defined mixed oxide matrix of phase purity. Conversely, the loading of effective promotant is limited by the concentration of structural hydroxls within the lattice as are typically associated with point defects or surface terminations of primary crystals.

In this application, we take advantage of the favourable structural matrices of ZrOx, Zr—CeOx and Zr—Ce-REOx (RE=Rare Earth) crystal structures with their proven hydrothermal durability into which the (redox) active metal ions can be dispersed with high (atomic) dispersion without negatively impacting their redox function. In fact, as is shown in the included examples by this process one can achieve a dramatic and durable promotion of the normal redox characteristics of OS materials. An analogy to this idea is the addition of $Ce^{4+}$ to the $ZrO_2$ matrix. The role of Ce in the catalytic oxidation of CO for example is based upon its redox activity as follows: $Ce^{3+}+O_2 \rightarrow O_2^-+Ce^{4+}$, followed by reaction of the $O_2^-$ anion with CO (NO) to give $CO_3$ ($NO_3$) and subsequent decomposition to $CO_2$ ($NO_2$) and $O^-$ and finally regeneration of $Ce^{3+}$. This reaction cycle can occur on pure $CeO_2$ and the nature/energy barrier of the $Ce^{4+} \leftrightarrows Ce^{3+}$ redox cycle can be probed using TPR (Temperature Programmed Reduction) with reduction peaks for surface $CeO_2$ at 350-600° C. No bulk $CeO_2$ is reduced at these temperatures the crystal lattice of the $CeO_2$ cannot accommodate the formation of the larger $Ce^{3+}$ ion and hence O mobility away from the bulk in order to preserve electrical neutrality cannot occur. However, when $Ce^{4+}$ ions are dispersed into the $ZrO_2$ lattice the redox activity of $Ce^{4+}$ is not negatively impacted but in fact is greatly enhanced, not primarily through modification of the inherent chemistry/reducibility of the $Ce^{4+}$ ion itself but more by a geometric mechanism as noted above where all the $Ce^{4+}$ ions are now accessible. Further, the presence of the $ZrO_2$ matrix greatly stabilises the material from surface area loss, crystallite growth and loss of porosity. $ZrO_2$ may also inhibit or protect $Ce^{4+}$ from formation of undesirable stable compounds with the acidic exhaust components such as $CO_2$ and $SO_2$ due to the inherent acidity of $ZrO_2$ relative to $CeO_2$.

By analogy to these conventional $CeO_2$ vs Ce—$ZrO_2$ systems, we now provide a similar beneficial and synergistic system that can be built using the (redox) active elements through a specific strong association through ion exchange. Thus, the present invention relates to a method of making a OIC/OS host material for treatment of exhaust gases comprising forming a solid solution of a substantially cubic fluorite Ce—ZrOx material as determined by conventional XRD, introducing a base metal element in said material by exchanging pre-existing hydroxyl sites in said Ce—ZrOx material, under high pH conditions, to thereby incorporate and stabilize said base metal element in high dispersion within said Ce—ZrOx material.

The Ce—ZrOx material of the invention is an OIC/OS material having about 0.5 to about 95 mole % zirconium, about 0.5 to about 90 mole % cerium, and optionally about 0.1 to about 20 mole % R, wherein R is selected from the group consisting of rare earth metal(s), alkaline earth metal(s), and combinations comprising at least one of the foregoing, based upon 100 mole % metal component in the material.

In a further aspect, the Ce—ZrOx material is an OIC/OS material based upon 100 mole % of the material comprising up to about 95 mole % zirconium; up to about 90 mole % cerium; up to about 25 mole % of a stabiliser selected from the group defined in the standard Periodic Table as rare earths, and combinations thereof comprising at least one of the stabilisers.

In carrying out the method of the invention, the base i.e. non Precious Group metal element is prepared as an alkaline solution, for example as an ammoniacal solution (ammonium hydroxide based solution) with a high pH as for example 8.0 to 9.5. The base metal can be a member selected from the group consisting of transition metals, alkali metals, and alkaline earth metals. Alternatively, the base metal element can also be introduced as a base metal complex with an organic amine in such cases where stable ammoniacal base metal solutions cannot be prepared.

The solution of the base metal as defined herein and the Ce—ZrOx solid material are mixed together to form a moist powder or paste. After drying the mixture is then calcined.

As an optional step, a platinum/precious group metal can be added to the OIC/OS material in the conventional way.

Benefits and features of the present invention include:

a) Provision of an OS material with enhanced low temperature reactivity and excellent hydrothermal durability;

b) No disruption of activity and ancillary catalytic functions of the ion-exchanged adatoms e.g. NOx trap/SCR, etc;

c) Improved performance due to the enhanced stability, higher dispersion and hence higher accessibility of the gaseous reactants to the redox active elements;

d) Advantage of pre-formed OS materials with desirable structural and textural properties e.g. single phase cubic systems, meso-porous systems of high and durable pore volume and SA (surface area) and hence, further enhance the associated performance benefits of post-modification;

e) Greater flexibility in chemical modification with minimal disruption of lattice parameter, phase purity, defect density, surface acidity basicity, etc.

f) The provision of a specific-post modification method for generic pre-existing commercial materials to produce a range of tailored and bespoke materials with characteristics and properties "tuned" to a specific application.

This strategy contrasts to that employed in the conventional OS material syntheses in which it is typical to employ expensive precious metals doping to attempt to achieve the scope of the goals outlined above.

This strategy is especially advantageous as conventional OS materials are known to possess various limitations.

Firstly, there is a requirement for increased Ceria reducibility at lower temperatures than is conventionally obtained with binary, tertiary or even quaternary Ce—Zr-REOx systems. These materials typically exhibit a redox maximum, as determined by $H_2$ Temperature Programmed Reduction (TPR) at ca. 600° C. This imposes the requirement for high exhaust gas/reaction temperatures in the application in order for the OS material to provide the maximum "buffering" or oxygen donation benefit. In order to address this temperature issue OS materials are typically "promoted" by the addition of a Precious Group Metal (PGM) component, e.g. Pt, Pd or Rh. However, promotion by these metals contributes a very significant additional cost to the price of the emission control system.

Secondly, typical OS materials used to date present limitations with regard to their total Oxygen Storage Capacity, that is to say the amount of available oxygen as measured by TPR is typically lower than that expected from consideration of the total Ce IV content of the OS material. Many data available to date are consistent with as little as only ca. 50% of the total Ce IV available undergoing reduction. At this time it is uncertain whether this is due to a fundamental issue, or due to limitations with the current synthetic method(s) employed in the manufacture of the OS material leading to a mixed Ce IV/Ce III valency or whether a combination of additional chemical, structural or textural limitations are responsible.

Finally, typical OS materials provide only limited, if any, additional synergies to the emission control system. As described elsewhere, ideal material components provide additional integrated chemical mechanisms to further enhance emissions control, e.g. NOx scavenging and reduction to $N_2$.

Hence, while OS materials are key components in realising highly active and durable vehicular exhaust emissions systems the pre-existing synthesis methods and materials present significant limitations to development of the next generation of exhaust catalyst that will be required to comply with newer and ever more stringent emission targets. What is required is a new class of OS materials that are active at lower temperatures, especially the Cold Start portion of vehicular applications to promote catalytic function. These OS materials should also display high hydrothermal durability and be tolerant to potential exhaust poisons in order to enable their use in the wide range of demanding exhaust environments.

The above-described and other features will be appreciated and understood by those skilled in the art from the following detailed description, drawings, and appended claims

BRIEF DESCRIPTION OF THE DRAWINGS

FIG. 9 summarises a detailed X-ray Diffraction (XRD) characterisation study of Cu-exchanged OS2 as both a function of Cu loading and as a function of aging cycle. The data confirms that for the 1 and 2.5% Cu exchange there is no discrete CuO formed, consistent with the proposed high dispersion. Only at 5% Cu is the presence of CuO recorded, consistent with an 'over-exchange' of the OS. Moreover the XRD data corroborate the hydrothermal durability suggested by the TPR data in FIG. 8, with only significant changes in structure seen for aging at 800° C./10% steam/Air/6 h. It is only after the severe 1100° C. aging that structural changes are evident, but these changes are more consistent with phase disproportionation of the 'parent' OS and again for the 1 and 2.5% Cu samples there is no evidence for XRD discrete Cu-containing phases.

FIG. 11 summarises a detailed X-ray Diffraction (XRD) characterisation study of Fe-exchanged OS3 as both a function of Fe loading and as a function of aging cycle. In this instance Triethanolamine (TEA) was employed to generate the basic/alkaline precursor complex. In this instance the data suggests that no discrete metal oxide ($Fe_2O_3$) is formed within the range examined, again consistent with the proposed high dispersion. Similar results are recorded after the aging at 800° C. in air and steam, although significant sintering of the cubic phase crystals are recorded. Again it is only after the severe 1100° C. aging that gross structural changes are evident. Firstly gross sintering of the cubic phase is evident with crystal diameters >1000 Å. Secondly, there presence of multiple phases is recorded arising from a combination of phase disproportionation of the 'parent' OS, sintering of the dispersed dopant to form a bulk $Fe_2O_3$ phase and solid state reaction between Fe and Ce. This is attributed to the very high concentrations of Fe species concentrated in the surface regions of the OS lattice.

FIGS. 12 and 13 illustrate a comparison between 2Ag—OS1 compositions arrived by either exchange route or by a standard precipitation synthesis route. These data reflect one of the strengths of the exchange method for OS promotion, i.e. the flexibility of the method to arrive at active and phase pure compositions normally difficult to achieve by direct synthesis. Hence while the 2Ag—OS1 sample produced by exchange demonstrates both phase purity and excellent low temperature redox, the same is not true for the sample produced by direct synthesis. The latter material exhibits ca. 50% of the redox activity for the fresh sample, and with a shift of about 50° C.+ in temperature for the redox peaks. After hydrothermal aging at 800° C. there is a further loss in redox function for both materials but again the sample produced by the exchange method displays marked redox benefits versus the Ag incorporated in the direct synthesis sample. The lower activity is seen to correlate with a loss of phase purity with the 2Ag—OS sample by synthesis displaying twin phases both fresh and aged, again in contrast to the exchanged sample which maintains phase purity under all conditions examined.

DETAILED DESCRIPTION OF THE INVENTION

Figure 1:
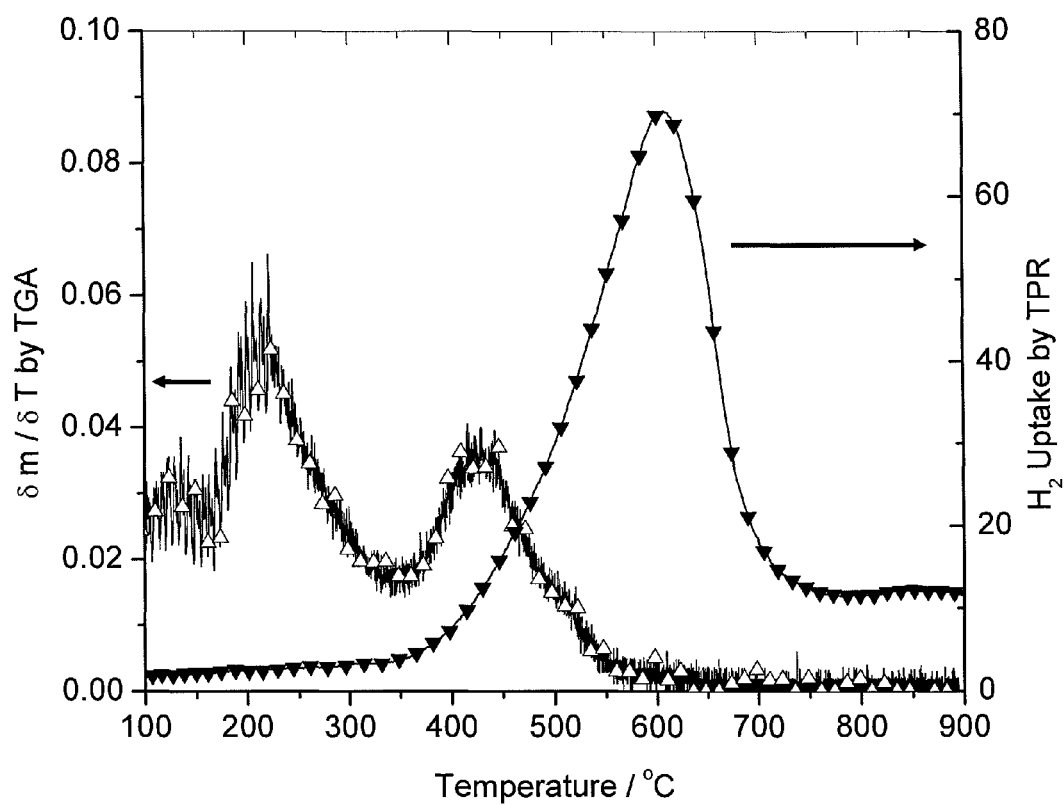
FIG. 1 compares the normalised mass loss response from a newly synthesised OS material versus its subsequent $H_2$ uptake response from $H_2$ TPR. The data shows a correlation between a mass loss feature (peak at ca. 450° C.) on the onset of redox activity.
Figure 2:
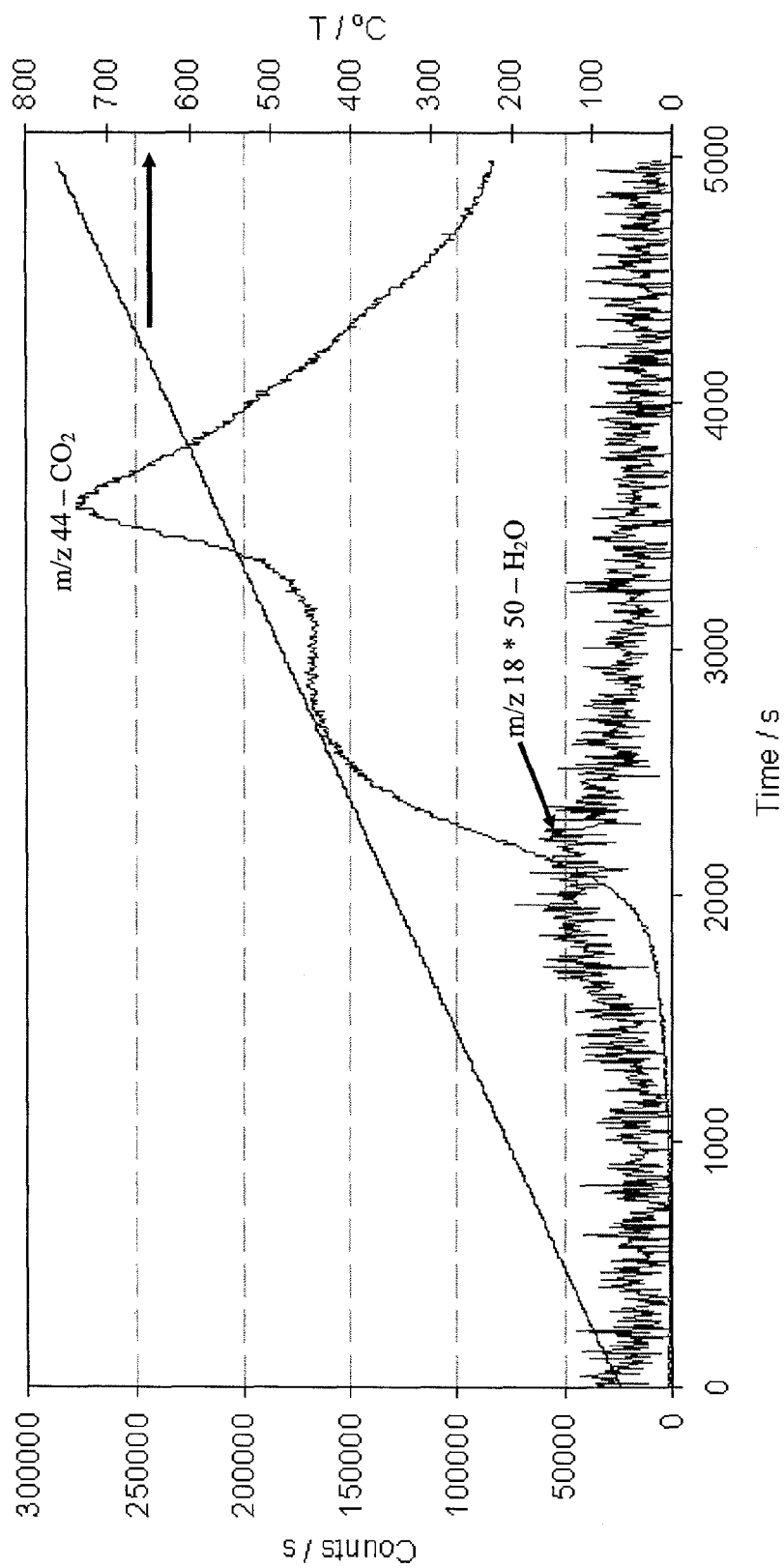
FIG. 2 shows a CO TPR experiment performed using a mass spectrometer as the detector. During the temperature ramp the onset of production of $CO_2$, from the oxidation of CO by the active oxygen of the OS, is seen to correlate with a peak of water evolution/desorption from the OS. The water evolution is ascribed to de-hydroxylation of $2^*Ce^{3+}$—OH defect sites with the subsequent generation of $H_2O$ and an oxygen vacancy within the OS lattice. The formation of these oxygen vacancies are required to enable oxygen ion transport from the bulk to the surface to enable the OS to be redox active.
Figure 3:
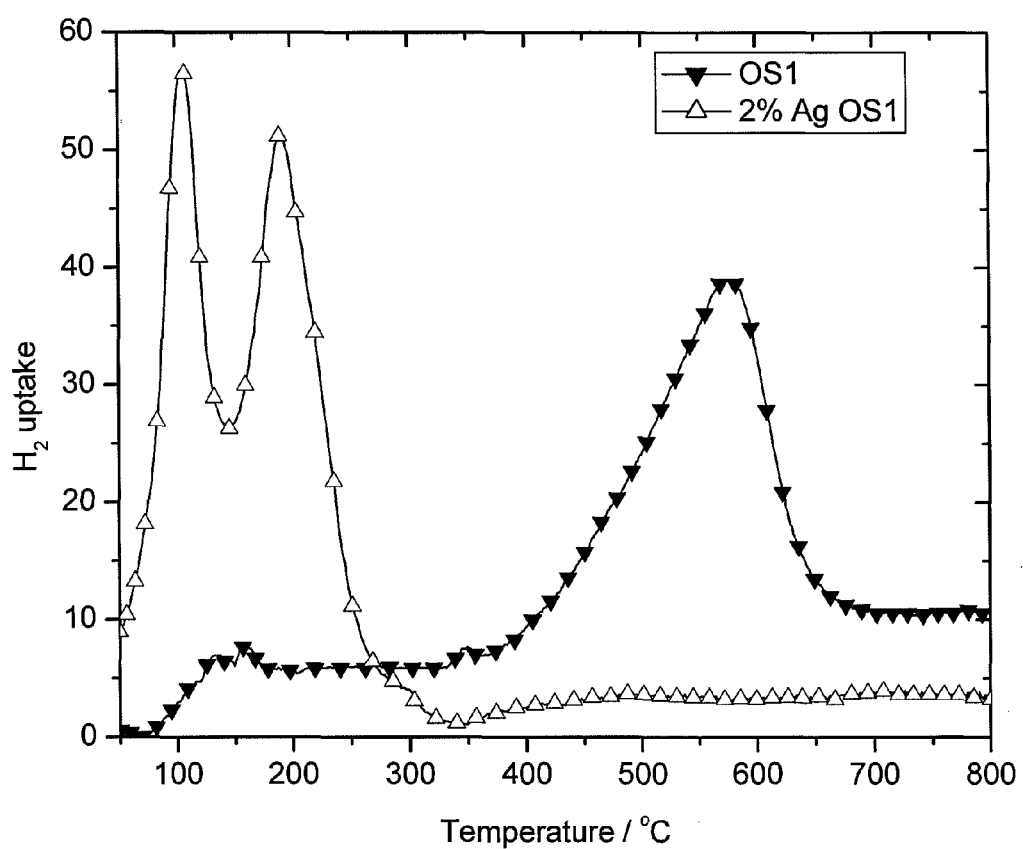
FIG. 3 shows the dramatic promotion of $H_2$ TPR characteristics of a $CeZrLaPrO_2$ OS (OS1) by the post-synthetic modification by basic ion exchange of 2% Silver (Ag). Without wishing to be bound by theory, it is argued that this benefit arises from the exchange of the proton of the $Ce^{3+}$—OH by Ag, with a resultant promotion of the oxygen ion conductivity of the material. This is ascribed to the elimination of the de-hydroxylation (and subsequent generation of lattice vacancies) phenomenon illustrated in FIGS. 1 and 2 which appears to be a requirement for the activation of the bulk of the crystal lattice to become redox active. The extent of this promotion is comparable to that noted for impregnation of PGM e.g. Pt, but at a fraction of the cost.

The present invention relates to a modified host for an emission treatment catalyst and method for making the same. The host is a substantially phase pure cubic fluorite (as determined by XRD method) of the Ce—ZrOx type which is well known in the art. The modification is proposed to arise, whilst not wishing to be bound by theory, from an ion exchange of the $Ce^{3+}$—OH hydroxyls, present in both the surface and to a lesser extent in the bulk of the crystal, by the base metal element/ion selected for this purpose.

The modified host materials may be applied advantageously to a wide range of emission control catalysts serving both gasoline (stoichiometric) and diesel (or other fuel lean) applications. One particular example described herein is for the application of these materials is in the area of catalytic oxidation/regeneration of diesel particulate matter captured and 'stored' on a conventional wall flow filter. This new generation of modified OS materials has been demonstrated as having particular benefit in affecting either lower temperature regeneration/oxidation of soot or an increased regeneration efficiency at a 'conventional' temperature as compared to non-modified OS materials. This example is not exclusive, merely illustrative of the potential benefits that may be realised by employing active materials produced by this novel post-synthetic modification method.

It should be further noted that the terms "first", "second" and the like herein do not denote any order of importance, but rather are used to distinguish one element from another, and the terms "a" and "an" herein do not denote a limitation of quantity, but rather denote the presence of at least one of the referenced items. Furthermore, all ranges disclosed herein are inclusive and combinable (e.g., ranges of "up to about 25 weight percent (wt. %), with about 5 wt. % to about 20 wt. % desired, and about 10 wt. % to about 15 wt. % more desired" is inclusive of the endpoints and all intermediate values of the ranges, e.g. "about 5 wt. % to about 25 wt. %, about 5 wt. % to about 15 wt. %" etc.

The basic exchange for enhanced redox process describes a method for the modification of conventional cerium-zirconium-based mixed oxides, also known as, oxygen storage materials (OSM). The process involves the treatment of the OSM with a basic, where possible preferentially ammoniacal metal solution. Base metals i.e. common metals, currently being employed in this process include, but are not limited to, transition metals, e.g. silver, copper and cobalt, alkali metals e.g. potassium, alkaline earth metals e.g. calcium, strontium, barium. In those instances where the base metal required for exchange do not form air stable ammoniacal complexes e.g. aluminium and iron, stable basic complexes of organic amines may be employed. The term "transition metal" as used herein means the 38 elements in groups 3 through 12 of the Periodic Table of the Elements.

The variables in the process include (1) the OSM/mixed oxide selected, (2) the metal used, and (3) the concentration of that metal. Metal concentrations successfully employed have ranged from 0.02 to 5.0 weight-percent. However, at higher metal exchange levels bulk metal oxides may be formed which do not retain the synergistic coupling with the OSM. Hence, the most preferred range for ion exchange is 0.1 to 2.5 weight-percent.

The base metals are typically received as a metal salt or solution of salt e.g. nitrate. As indicated, most base metals form a water-soluble complex with ammonium hydroxide. In those instances wherein the ammoniacal complex is unstable an organic amine e.g. tri-ethanolamine may be employed instead. In the process, the solution of an acidic metal solution is converted to a chemically basic form by addition of the ammoniacal base. The chemistry and amounts of base used vary with the metal used. The resulting solution is then used to impregnate the mixed oxide powder, thereby ion-exchanging the surface and sub-surface Ce—OH hydroxyls (surface terminations and bulk defects which act as acidic centres under the conditions of synthesis). It is this exchange process which is believed to be responsible for the improvements in the redox behaviour of the thus modified mixed oxide. Evidence for an exchange mechanism is further derived from washing studies wherein freshly promoted materials, without subsequent calcination, were repeatedly washed with water and the supernatant liquid analysed for soluble metal species with but a few (<10) ppm of soluble metal being detected. As a final step in the process the impregnated mixed oxide is then calcined at sufficient temperature to drive off the inorganic anions (e.g. nitrate and ammonium ions), typically >350° C. After calcination the metal that was added is proposed to be bound to the former Ce—OH centres.

The mixed oxide/OSM material of this invention comprises any known or predicted Cerium-containing or Ce—Zr-based stable solid solution. Preferably, the solid solution contains a cationic lattice with a single-phase, as determined by standard X-ray Diffraction method. More preferably this single-phase is a cubic structure, with a cubic fluorite structure being most preferred. Additionally it is noted that the ion exchange process may be performed without formation of additional bulk phase, as determined by XRD, providing the concentration of exchanged cation does not exceed the Ce—OH 'concentration' of the cubic fluorite lattice. In various embodiments, the OS material may include those OS materials disclosed in U.S. Pat. Nos. 6,585,944 6,468,941 6,387,338 and 6,605,264 which are herein incorporated by reference in their entirety. However, the flexibility of the basic exchange provides for the modification of all current known Cerium oxide and Ce—Zr-based solid solution materials to be thusly modified and enhanced.

The OS materials modified by the basic exchange method comprise a composition having a balance of sufficient amount of zirconium to decrease the reduction energies of $Ce^{4+}$ and the activation energy for mobility of 'O' within the lattice and a sufficient amount of cerium to provide the desired oxygen storage capacity. In another embodiment the OS shall contain a sufficient amount of stabiliser e.g. yttrium, rare earth (La/Pr etc.) or combination thereof to stabilise the solid solution in the preferred cubic crystalline phase.

Figure 4:
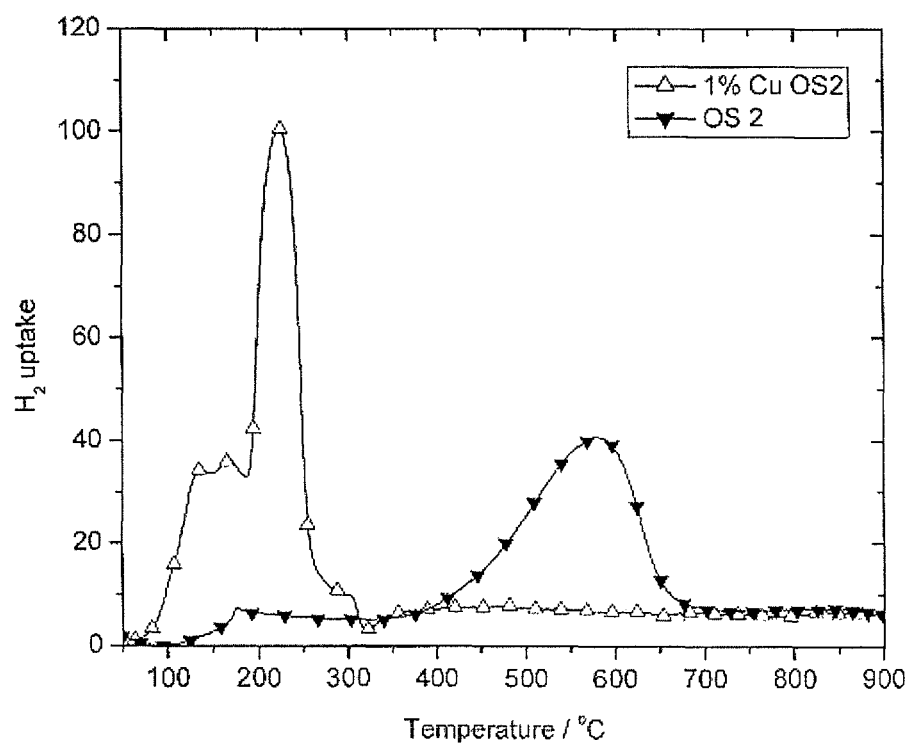
FIG. 4 compares the $H_2$ TPR performance of a second $CeZrLaPrO_2$ mixed oxide (OS2) before and after post-synthetic basic exchange of 1% Cu. The incorporation of Copper (Cu) results in a dramatic promotion of the redox properties of the OS, with the exchanged material exhibiting high redox function at T<300° C. cf. the non-exchanged material which exhibits a redox maximum at ca. 575° C.
Figure 5:
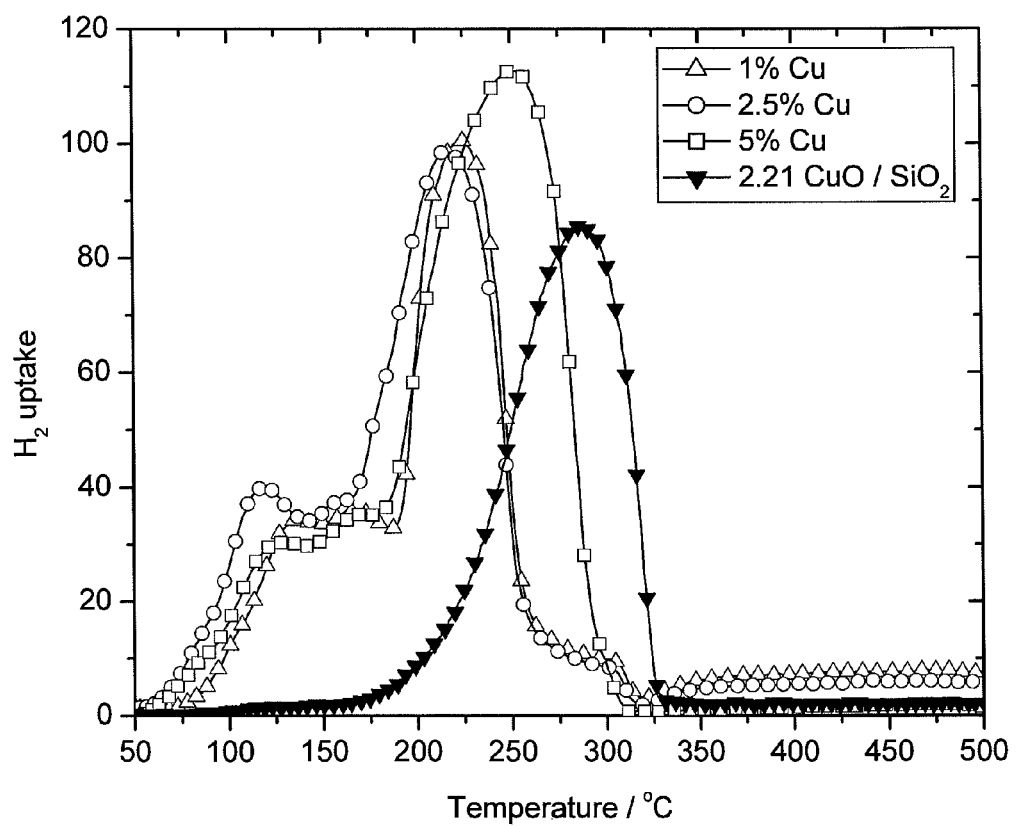
FIG. 5 illustrates the impact of exchanged Cu loading on the redox performance of the OS2 versus the activity with a 2.21% $CuO$—$SiO_2$ reference powder. In all cases the dramatic enhancement of redox activity is observed with increasing levels of Cu resulting in an increase of the large redox feature centred at 225-250° C. This higher temperature peak is ascribed to CuO ensembles with a redox character more similar to bulk CuO, as can be seen by comparison with the CuO—$SiO_2$. However the data again confirms a synergistic coupling of the redox chemistries of the OS and the dopant ion.
Figure 6:
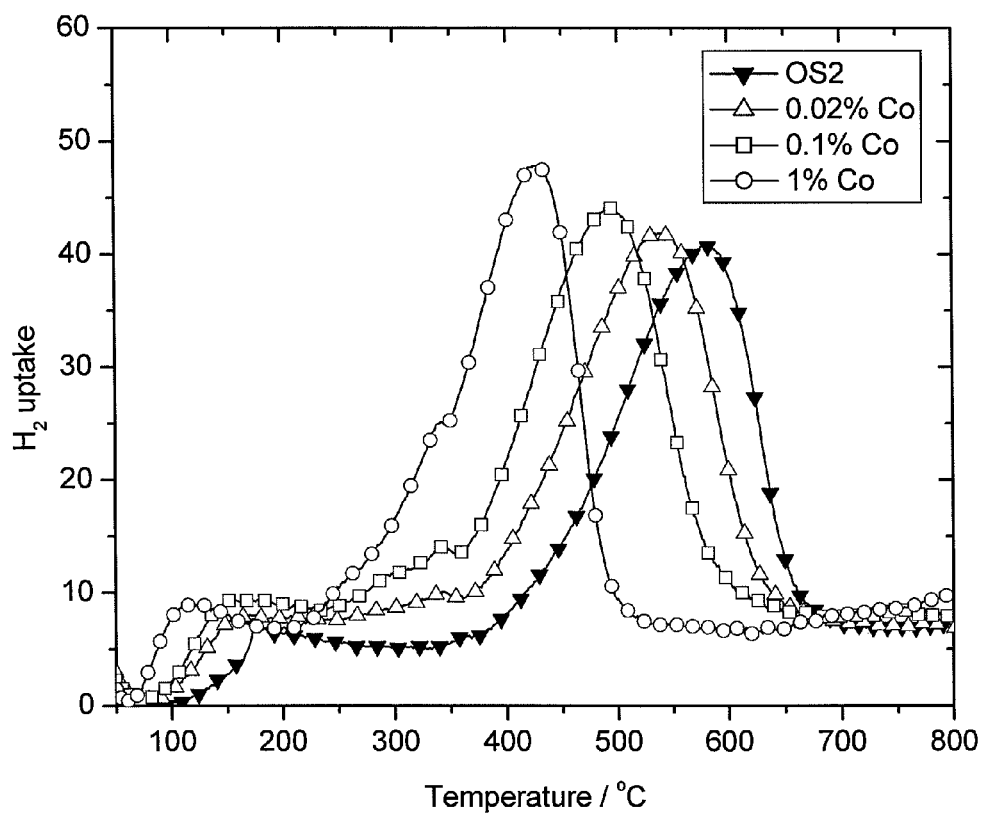
FIG. 6 demonstrates the impact of low, but increasing, levels of Cobalt (Co) ion exchange on the redox performance of OS2. Benefits/decreased redox temperature are seen for Co levels as low as 0.02% by mass and the promotion continues at 0.1 and 1% with the latter showing a decrease of ca. 150° C. in the temperature for peak redox.
Figure 7A:
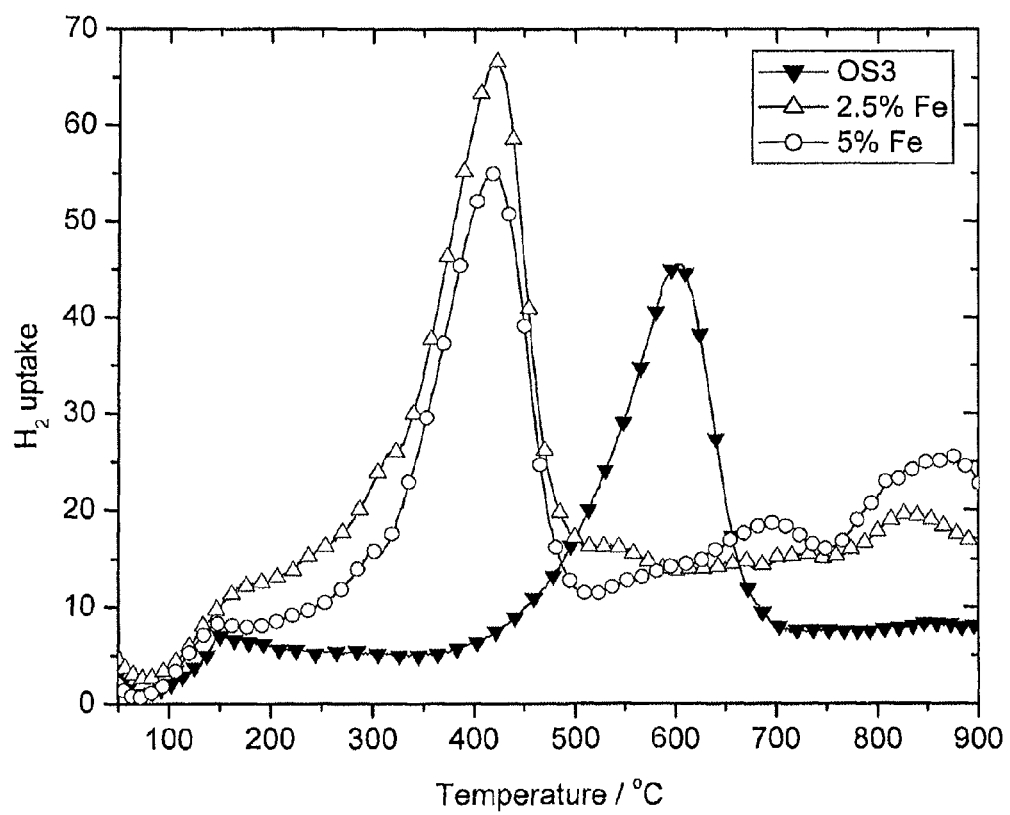
FIG. 7a confirms that the enhancement of redox properties may also be achieved using Iron (Fe). In this case the performance of a $CeZrLaYO_2$ (OS3) undergoes dramatic promotion by the incorporation of Fe at either 2.5 or 5%. In this example however there is some evidence for the formation of discrete $Fe_2O_3$ (redox peaks at >650° C.). Moreover, comparison of the 2.5% exchanged Fe—OS3 versus an analogous composition, prepared by a commercial supplier in a manner similar to that described in U.S. Pat. No. 6,585,944 B1, shows the comparable performance for the exchanged OS3 (FIG. 7b). Indeed the exchanged sample, prepared by a significantly simpler method, shows a small improvement in redox characteristic with a Ce reduction maximum ca. 40° C. lower than that for sample prepared by the deliberate synthesis method.
Figure 7B:
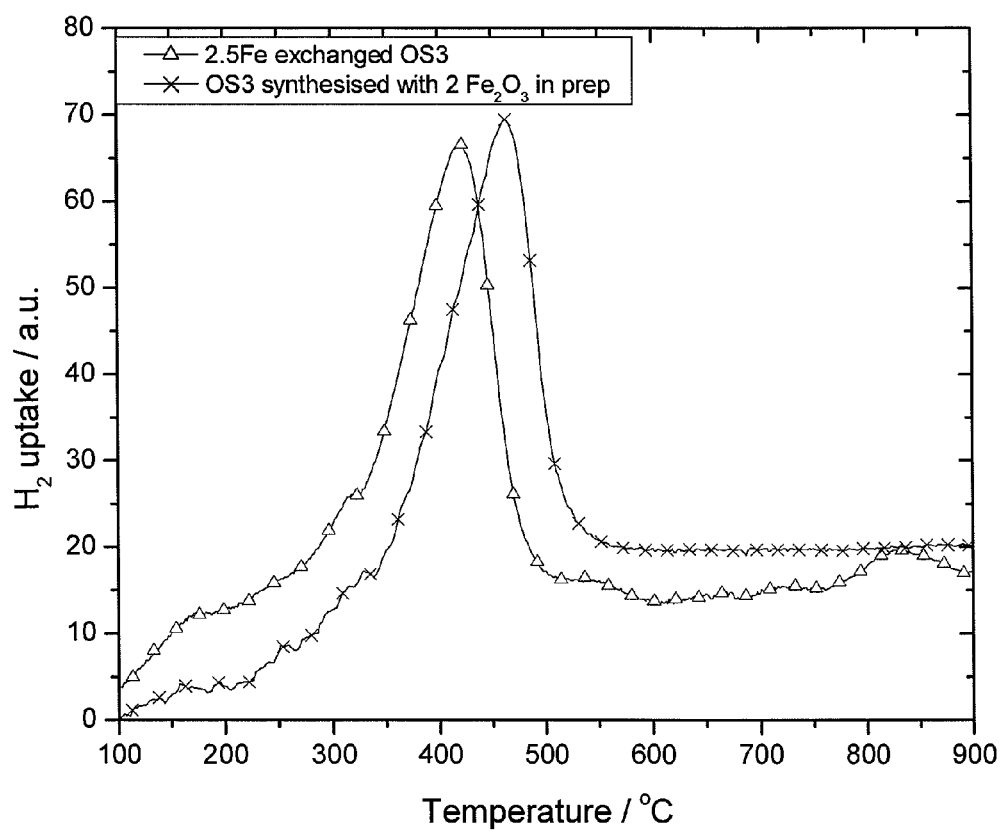
Figure 8:
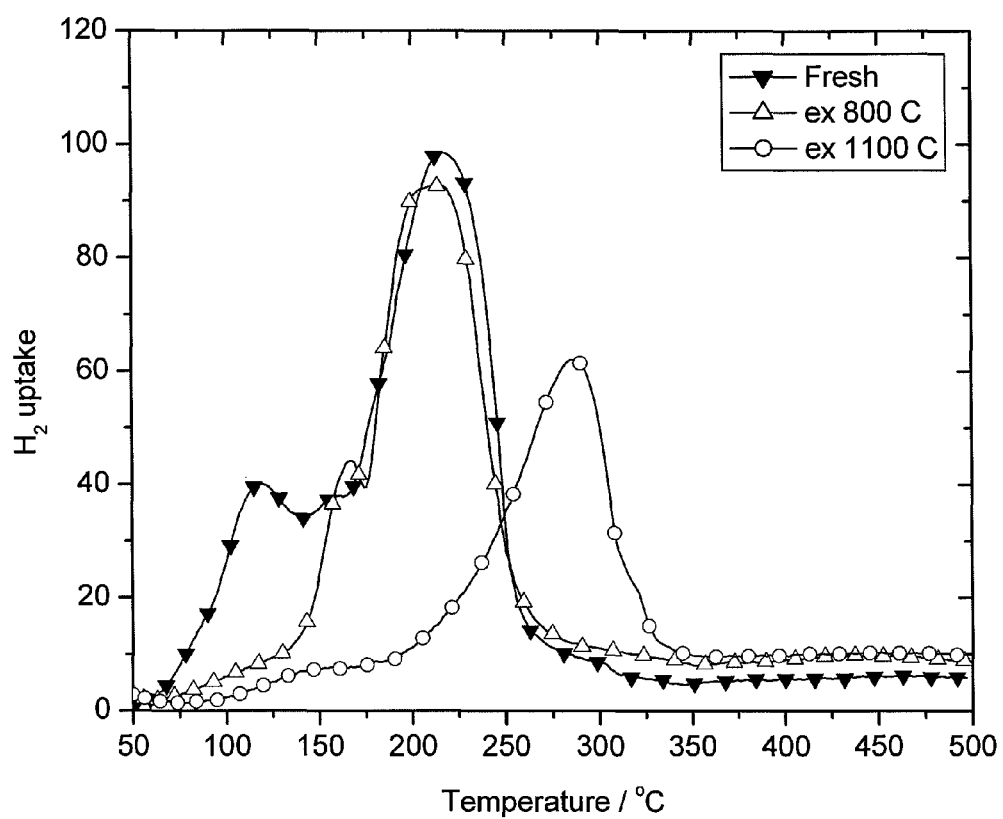
FIG. 8 reflects the hydrothermal durability of the 2.5% Cu-exchanged OS2 material. This sample was subjected to two aging cycles, the first at 800° C./10% steam/Air for 6 h (an aging condition relevant to Diesel aftertreatment applications) and the second at 1100° C./dry air for 6 h (to mimic a gasoline aging). After both aging cycles the low temperature redox feature is retained, even after the very severe 1100° C. aging. This is consistent with a strong interaction between the exchanged cation and the OS lattice.
Figure 10:
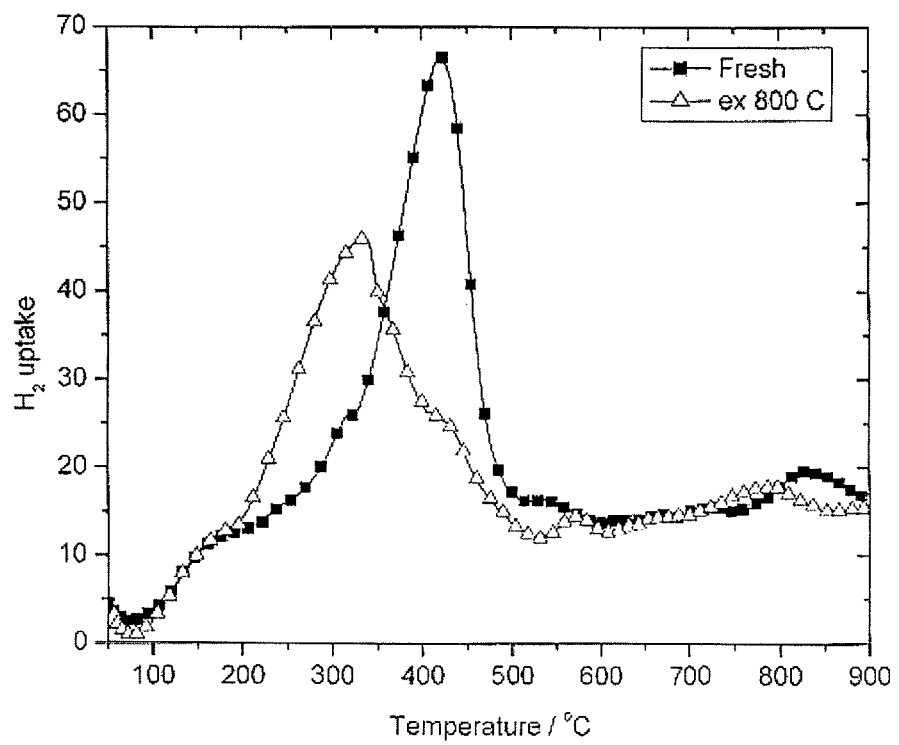
FIG. 10 shows the impact of a typical 'Diesel' aging cycle (800° C./10% steam/Air for 6 h) on the redox activity of 2.5% Fe—OS3. Again the material retains high redox function after aging, indeed after aging the peak redox temperature is now seen at lower temperatures (325° C. vs 425° C. fresh) and the redox feature associated with bulk $Fe_2O_3$ is markedly attenuated suggesting an increased interaction and re-dispersion of the cations during the aging cycle.
Figure 12:
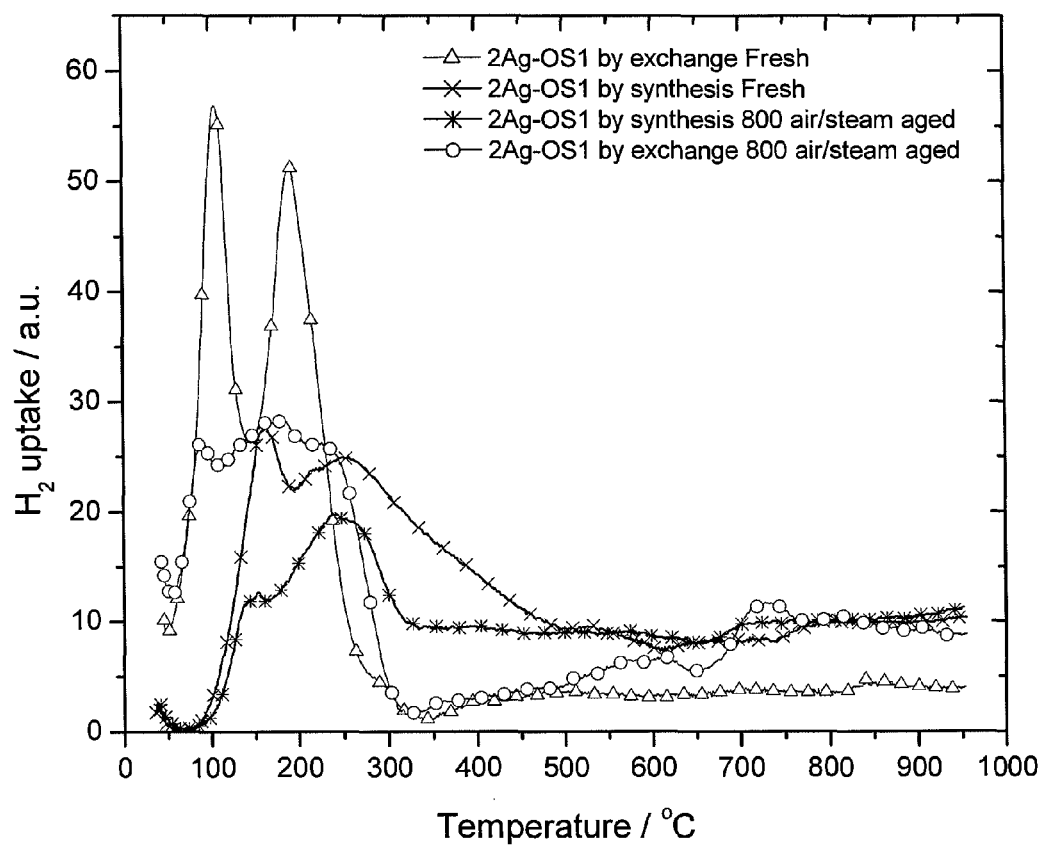

The OS materials modified by the basic exchange method should preferably be characterised by a substantially cubic fluorite structure, as determined by conventional XRD methods. The percentage of the OS material having the cubic structure, both prior and post exchange, is preferably greater than about 95%, with greater than about 99% typical, and essentially 100% cubic structure generally obtained (i.e. an immeasurable amount of tetragonal phase based upon current measurement technology). The exchanged OS material is further characterised in that it possesses large improvements in durable redox activity with respect to facile oxygen storage and increased release capacity e.g as determined by conventional Temperature Programmed Reduction (TPR) method. Thus, for Cu exchanged solid solutions, for example, the reduction of Ce+Cu is observed to occur at a temperature of about 300 to about 350° C. lower than would occur in the absence of the Cu dopant (FIG. 4). In the case of iron, the Ce+Fe reduction is shifted to lower temperatures by about 100 to about 200° C.

In an exemplary embodiment, the OS material, based upon 100 mole % of the material preferably comprises up to about 95 mole % zirconium; up to about 95 mole % cerium; up to about 20 mole % of a stabiliser or stabilisers selected from the group consisting yttrium, rare earths and combinations comprising at least one of the stabilisers.

In another embodiment, the OS material prior to exchange is a solid solution of Ce—Zr—R—Nb, wherein "R" is a rare earth metal or a combination comprising at least one of the following metals yttrium, lanthanum, praseodymium, neodymium and combinations comprising at least one of these metals preferred.

EXAMPLES

The procedure for making 100 grams of 2% $Ag(NH_3)_2$ OS1 (oxygen storage material #1), is as follows:

1. Weigh 100 g of OS1, correct for moisture content (ca. 1.5% water).
2. Weigh 3.15 g of silver nitrate crystals. One must compensate for the percentage of metal in the nitrate salt or solution used. Silver nitrate is 63.52% silver.
3. Dissolve silver nitrate in 50 g deionised water. The amount of water used is determined by the water adsorption capacity of the mixed oxide used. This is generally between 0.5 and 0.6 g water per gram mixed oxide.
4. Add concentrated $NH_4OH_{aq}$ (~30% ammonia) to the silver nitrate solution, dropwise, until a clear silver di-ammoniacal solution is obtained. Solution will first turn brown-black, then clear upon excess addition of ammonium hydroxide.

5. Add silver di-ammoniacal solution to mixed oxide powder. Mix thoroughly to produce homogeneous and even-coloured moist powder.
6. Allow powder to rest at room temperature for one hour.
7. Dry in oven at ~110° C. for ca. 2 hours or until dry.
8. Calcine in furnace at 540° C. for 4 hours in air.

100 Grams of 2.5% Cu(NH3)4 Exchanged OS2—

Weigh 10.86 g of copper (II) nitrate trihydrate and dissolve in 50 g of deionised water. Add 30-weight % ammonium hydroxide solution (~8.0 g) to copper solution until a blue-black copper tetra-ammoniacal solution is obtained. Then add copper tetramine solution to 100 g of OS2 (on dry basis), with mixing until a homogeneous powder is obtained. Dry and calcine at 540° C. for 4 hours.

100 Grams of 1% Co(NH$_3$)x Exchanged OS2—

Dissolve 4.94 g of cobalt (II) nitrate hexahydrate in 50 g of deionised water. Add 30-weight % ammonium hydroxide solution (~6.5 g) until a bright blue ammoniacal cobalt solution is obtained. Maintain pH between 8.0 and 9.5. Care must be taken not to add excess ammonium hydroxide as this will result in a gelation of the solution due to hydroxide formation. Add ammoniacal cobalt solution to 100 g of OS2 (dry), with mixing until a homogeneous powder is obtained. Dry and calcine at 540° C. for 4 hours.

100 Grams of 1% Cu(NH$_3$)4 Exchanged OS3—

Weigh 3.80 g of copper (II) nitrate trihydrate and dissolve in 50 g of deionised water. Add 30-weight percent. Ammonium hydroxide solution (~3.0 g) to copper solution until a blue-black copper tetramine solution is obtained. Then add copper tetramine solution to 100 g of OS2 (dry), with mixing until a homogenous powder is obtained. Dry and calcine at 540° C. for 4 hours.

100 Grams of 2.5% Fe-Triethanolamine Exchanged OS3—

Weigh 18.08 g of iron (III) nitrate nona-hydrate and dissolve in 400 g of deionised water. Weigh 43.4 of triethanolamine. Slowly pour the iron nitrate solution into triethanolamine solution with vigorous stirring. Iron solubility is limited in ammoniacal form. The correct ratio is 22 g of water and 2.4 g triethanolamine per g of iron nitrate nonahydrate. Once the iron-triethanolamine solution is prepared, add it to 100 g of OS3 (dry). The resulting slurry will be fluid with a low viscosity. Dry the slurry mixture in a rotating steam evaporator. Then calcine at 540° C. for 4 hours.

OS1=44% CeO$_2$; 42% ZrO$_2$/HfO$_2$; 9.5% La$_2$O$_3$; 4.5% Pr$_6$O$_{11}$

OS2=40% CeO$_2$; 50% ZrO$_2$/HfO$_2$; 5% La$_2$O$_3$; 5% Pr$_6$O$_{11}$

OS3=31.5% CeO$_2$; 58.5% ZrO$_2$/HfO$_2$; 5% La$_2$O$_3$; 5% Y$_2$O$_3$

All compositions quoted as wt %

We claim:

1. A method for the production of a catalytic material containing highly dispersed metal atoms or metal ions, which method comprises:
an ion exchange process, wherein a metal oxide support material, which comprises a cerium oxide, is contacted with a precursor solution of dissolved cations selected from the group consisting of a non-precious transition metal, an alkali metal, an alkaline earth metal, and a group IIIb metal, under conditions of high pH/low Hydronium Ion (H$_3$O$^+$)/low proton (H$^+$) content, wherein high pH refers to values from about 8.0 to about 9.5;
followed by drying and calcination of the thus contacted metal oxide support material to remove any solvent and to convert the cations into highly dispersed metallic or metal oxide ensembles or clusters.

2. The method of claim 1 wherein the cation solution employed contains an ammoniacal complex of the metal cations.

3. The method of claim 1 wherein the cation solution contains an organic amine complex of the metal cations.

4. The method of claim 1 wherein the cation solution contains a hydroxide compound of the metal cations.

5. The method of claim 1 wherein the cation solution is a cation complex in solution which is a base/common metal selected from the group consisting of a non-precious transition metal, an alkali metal, an alkaline earth metal, and a group IIIb metal.

6. The method of claim 1 wherein the material is calcined at temperatures in excess of 350° C. to convert metal precursor into final dispersed metal/metal oxide state.

7. The method of claim 1 wherein the concentration of metal species thus introduced is about 0.01 weight % to about 10 weight %.

8. The method of claim 1 wherein the oxide support is a refractory oxide.

9. The method of claim 1 wherein the Cerium oxide is a solid solution of Cerium and Zirconium Oxide (Ce—Zr Oxide).

10. The method of claim 9 wherein the Ce—Zr oxide is substantially phase pure solid solution with oxygen ion conducting properties and comprises
a. up to about 95 mole % Zirconium;
b. up to about 95 mole % Cerium; and
c. up to about 20 mole % of a stabiliser selected from the group consisting of rare earths, yttrium and combinations comprising at least one of the stabilisers.

11. The method of claim 1 wherein the metal oxide support material is contacted with the precursor solution of dissolved cations in a state where the metal oxide support material has not already been applied to a support structure.

12. A method for the production of a catalytic material containing highly dispersed metal atoms or metal ions, which method comprises:
an ion exchange process, wherein a metal oxide support material, which comprises a cerium oxide, is contacted with a precursor solution dissolved cations selected from the group consisting of a non-precious transition metal, an alkali metal, an alkaline earth metal, and a group IIIb metal, under conditions of high pH/low Hydronium Ion (H$_3$O$^+$)/low proton (H$^+$) content, wherein high pH refers to values from about 8.0 to about 9.5;
followed by drying and calcination of the thus contacted metal oxide support material to remove any solvent and to convert the cations into highly dispersed metallic or metal oxide ensembles or clusters, wherein
the Cerium oxide is a solid solution of Cerium and Zirconium Oxide (Ce—Zr Oxide),
the Ce—Zr oxide is a substantially phase pure solid solution with oxygen ion conducting properties and comprises
a. up to about 95 mole % Zirconium;
b. up to about 95 mole % Cerium; and
c. up to about 20 mole % of a stabiliser selected from the group consisting of rare earths, yttrium, and combinations comprising at least one of the stabilisers, and
the concentration of metal species introduced is 0.1 weight % to about 2.5 weight %.

13. A method for the production of a catalytic material containing highly dispersed metal atoms or metal ions, which method comprises:

an ion exchange process, wherein a metal oxide support material, which comprises a cerium oxide, is contacted with a precursor solution of dissolved cations selected from the group consisting of a transition metal, an alkali metal, an alkaline earth metal and group IIIb metal, under conditions of high pH/low Hydronium Ion ($H_3O^+$)/low proton ($H^+$) content, wherein high pH refers to values from about 8.0 to about 9.5;

followed by drying and calcination of the thus contacted metal oxide support material to remove any solvent and to convert the cations into highly dispersed metallic or metal oxide ensembles or clusters, and wherein the metal selected for the precursor solution of dissolved cations is a non-Precious metal group metal.

14. The method of claim 13, comprising a further step of adding a precious group metal to the contacted metal oxide support material.

15. The method of claim 1, wherein the cation in the precursor solution of dissolved cations is an iron cation.

\* \* \* \* \*